United States Patent [19]

Meyers et al.

[11] Patent Number: 5,375,223
[45] Date of Patent: Dec. 20, 1994

[54] SINGLE REGISTER ARBITER CIRCUIT

[75] Inventors: Steven D. Meyers, Hurley; Hung C. Ngo; Paul R. Schwartz, both of Kingston, all of N.Y.

[73] Assignee: International Business Machines Corporation, Armonk, N.Y.

[21] Appl. No.: 1,372

[22] Filed: Jan. 7, 1993

[51] Int. Cl.[5] ............................................. G06F 13/18
[52] U.S. Cl. .................................. 395/425; 395/725; 364/DIG. 1; 364/228.1; 364/229; 364/230; 364/230.1; 364/242.6; 364/243; 364/243.41; 364/243.5; 364/244.3; 364/246.1; 364/246.12; 364/247; 364/247.7
[58] Field of Search ................ 395/725, 325, 425, 275

[56] References Cited
U.S. PATENT DOCUMENTS

| | | | |
|---|---|---|---|
| 4,225,922 | 9/1980 | Porter | 395/250 |
| 4,323,968 | 4/1982 | Capozzi | 395/575 |
| 4,425,615 | 1/1984 | Swenson et al. | 395/425 |
| 4,488,218 | 12/1984 | Grimes | 395/325 |
| 4,633,387 | 12/1986 | Hartung et al. | 395/650 |
| 4,707,784 | 11/1987 | Ryan et al. | 395/425 |
| 4,807,110 | 2/1989 | Pomerene et al. | 395/425 |
| 4,858,108 | 8/1989 | Ogawa et al. | 395/425 |
| 4,958,277 | 9/1990 | Hill et al. | 395/325 |
| 4,965,716 | 10/1990 | Sweeney | 395/325 |
| 4,992,930 | 2/1991 | Gilfeather | 395/425 |
| 5,023,776 | 6/1991 | Gregor | 395/425 |
| 5,151,994 | 9/1992 | Wille et al. | 395/725 |
| 5,265,223 | 11/1993 | Brockmann et al. | 395/325 |
| 5,265,257 | 11/1993 | Simcoe et al. | 395/725 |

Primary Examiner—Jack B. Harvey
Assistant Examiner—Ayaz R. Sheikh
Attorney, Agent, or Firm—Lynn L. Augspurger; Peter Visserman

[57] ABSTRACT

In a multiprocessor system, a plurality of data processors are each equipped with a local, level 1, cache and have access to a main memory through memory access circuit having a level 2 cache and a single register arbiter. The single register includes a primary queue defining priority of requests from the plurality of processors and a secondary queue defining processor requiring access to main memory. The register contains one position for each of the processors served and employs a pointer for demarcation between the primary and secondary queues. When a request is detected, the highest priority processor in the primary queue is served and when the requested memory address is in the level 2 cache, it will be retrieved and the identity of the served processor will be moved to the low end of the primary queue as defined by the pointer. In the event that a main memory access is required, a MISS window is opened and the identity of the requesting processor is entered at the low end of the queue and the pointer is incremented thereby increasing the length of the secondary queue and reducing the length of the primary queue. When the MISS window closes, the pointer is decremented, thereby moving the identity of the served processor from the high end of the secondary queue to the low end of the primary queue.

12 Claims, 4 Drawing Sheets

SINGLE REGISTER ARBITER CIRCUIT

BACKGROUND OF THE INVENTION

1. Field of the Invention

The invention relates to data processing systems and more particularly to arbiter circuits for use in data processing systems.

2. Prior Art

Arbiters are typically used in data processing systems to resolve conflicts among data handling circuits employing shared resources such as memory units or data transfer buses in multiprocessor systems, or the like. In certain cases, the arbiter used to resolve access conflicts for resources requiring one-term access and resources requiring short-term access. By way of example in some of processor systems, all of the processors obtained access to a main memory through a common memory access circuit. The memory access circuit may include a cache memory storing a copy of information stored at certain addresses in the main memory. When one of the processors requires access to main memory, it sends a request to the memory access circuit and the memory access circuit fetches the data from its cache memory, when the information corresponding to the requested main memory address is stored in the cache. When the information corresponding to the requested main memory address is not in the cache, the memory access circuits initiate a main memory read operation. Because the main memory is typically a comparatively large memory and may be a non-volatile memory, such as a disk store having a relatively long data read times, the memory access circuitry can serve a request for data stored in its cache memory in considerably less time than when the requested data is not in cache. The case in which the data is found in cache is commonly referred to as a HIT. In the case in which the requested is not found in the cache memory, is referred to as a MISS. In the event of a MISS, the memory access circuit initiates a main memory read operation and must wait for data to be returned from main memory. The period of time between the transmission of a request and the receipt of data is referred to as a MISS window. Because the cache memory operations and the main memory operations, within the memory access circuit, are to some extent independent of each other, the memory access circuit is able to serve one or more HIT requests during a MISS window. However, such a dual operation requires the use of a dual queue.

Arbiter circuitry, including dual queues, are typically implemented in hardware since the conflicts must be resolved at a circuit level in the shortest possible real time in order to avoid undesirable delays in memory access. Furthermore, queues are preferably constructed such that they are simple to administer in order to avoid a time delay due to the administration of the queues. Additionally, the hardware queues are preferably constructed of integrated circuitry with a minimum number of circuits.

Other situations, where short-term requests and long-term requests may be handled on an overlap basis may occur in data processors using common circuitry and performing certain long-term functions, such as input/output functions for certain input/output terminals requiring long access times and other terminals requiring sufficiently shorter access times that the circuitry can be employed to perform functions with respect to different input/output terminals, on an overlap basis. In such a case, a simplified dual queue structure is highly desirable.

SUMMARY OF THE INVENTION

These and the problems of the prior art are overcome in accordance with the principles of this invention by means of a single register arbiter circuit in which multiple queues are implemented in a single register. The arbiter circuit of this invention comprises a single multi-position register and a separate pointer register which defines a demarcation between a short-term access queue and a long-term access queue within the same register. More specifically, in a data processor system including a number of subsystems generating service requests, a hardware register having a number of sequentially arranged positions, equal in number to the number of subsystems being served, has the highest priority position of a primary, short-term queue defined by one end of the register and the lowest priority position defined by a pointer. The highest position of a secondary, long-term queue is immediately adjacent to the lowest position of the primary queue and the lowest position of the secondary queue is at the opposite end of the register. When a number of requests are received, the subsystem identified in the position nearest the high end of the queue register is served and if it is a short-term request, the identity of the served subsystem will be entered immediately to the left of the pointer to assume a low-priority position in the short-term queue. In the event that the request is found to be a long-term request, and the long-term resource is available, access will be initiated and the identity of the system from which the long-term request was detected is entered on the low end of the register and identities of other subsystems in positions between the low end of the register and the previous position of the subsystem served are shifted toward the high end of the register. Furthermore, the pointer register is incremented, thereby reducing the queue of short-term requests and extending the queue of long-term requests. When a long-term request has been served, the pointer is decremented thereby, in effect, moving the identity of the served subsystem from the high end of the long-term queue to the low end of the short-term queue. Advantageously, a double queue is implemented in accordance with this invention by means of a register having n $LOG_2 n$ binary bits. By way of example, in a data processing system employing eight subsystems requiring access to short-term and long-term shared resources can be implemented by means of a register having $8 LOG_2 8 = 24$ binary bits. Advantageously, the register requires no more positions than the number of subsystems being served and requires no more binary bits in each position than required to define n separate subsystems.

In a particular embodiment of the invention, a multiprocessor system comprises a number of data processors, all of which have access to a main memory through a memory interface circuit provided with an internal cache and a single register queue and wherein incoming requests are served in accordance with a priority scheme defined by the order of the data processors identified in a primary queue in the upper part of the queue register. The cache is examined and if the request can be served from the cache, the identity of the served processor is entered in the lower end of the primary queue as defined by the pointer. If the request cannot be handled from the cache, a MISS window is opened to access main memory and the identity of the requesting processor is entered on the low end of the register and the pointer is incremented. In this manner, a processor is transferred from a primary FREE queue to a secondary MISS queue. Each time a main memory access cycle has been completed, the pointer is decremented, thereby moving the identity of the served processor from the high end of the secondary queue to the low end of the primary queue. Advantageously, a primary and secondary queue are implemented in a single register without requiring more positions in the queue than the total number of processors in the system.

BRIEF DESCRIPTION OF THE DRAWING

An illustrative embodiment of the invention is described below with reference to the drawing, in which.

DETAILED DESCRIPTION

Figure 1:
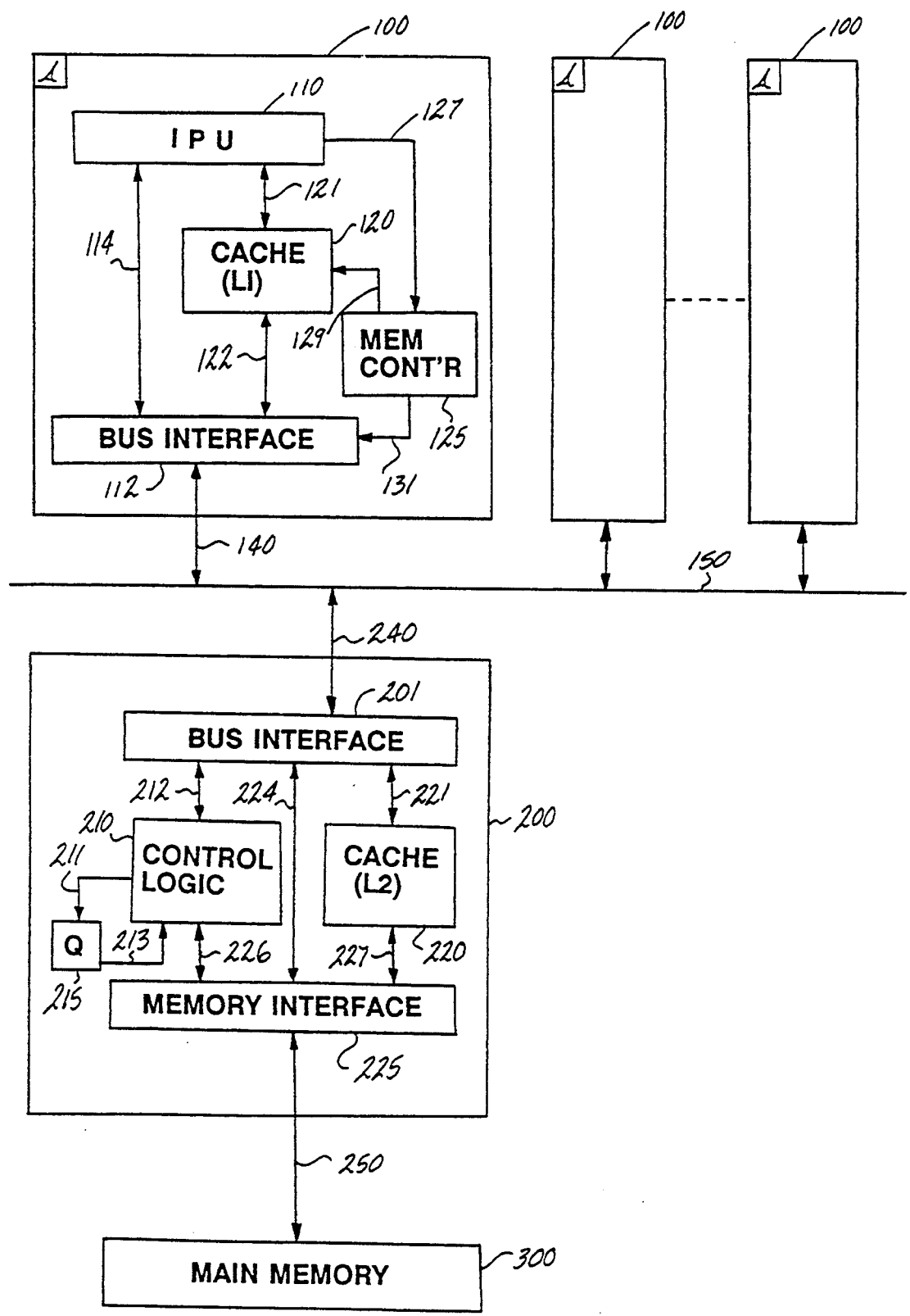
FIG. 1 is a block diagram representation of a multiprocessor data processing system incorporating the principles of the invention.

FIG. 1 is a block diagram representation of a multiprocessor data processing system in which the principles of the invention are illustrated. The system of FIG. 1 includes a plurality of processors 100 which, for the purposes of this description, are identical. Only one of the processors is shown in a greater detail for a better understanding of the invention. The processors 100 are connected to a memory access circuit 200 via an interconnecting bus 150. The memory access circuit 200 is connected to a main memory 300 and provides an interface between the processors 100 and the main memory 300. Each of the processors 100 include an information processing unit (IPU) which performs the standard information processing functions in a data processor. The IPU 110 is connected to a bus interface circuit 112 via a bidirectional data bus 114 and data words are transferred between the IPU and the main memory 300 via the memory access circuit 200 and the interconnecting bus 150. Each of the processors 100 further includes a level 1 (L1) cache memory 120 and the memory access circuit 200 comprises a level 2 (L2) cache memory 220. Both the L1 cache and the L2 cache store information from selected address areas of the main memory 300.

The cache memory 120 is connected to the IPU 110 via cable 121 and to bus interface 112 via cable 122. The IPU 110 receives its instructions to be executed from the L1 cache 120 in response to requests transmitted by the IPU 110 to memory controller 125 via cable 127. The memory controller 125 is connected to the cache 120 via cable 129 and to the bus interface 112 via cable 131. In operation, the IPU 110 requests instructions or data from the L1 cache 120 by initiating a request, including a main memory address, to the memory controller 125. The controller 125, in a standard and well known fashion determines whether the requested information is available in the L1 cache 120. If so, it will cause the information to be read from the L1 cache and transmitted to the IPU 110 via cable 121. In the event that the requested address is not included in the information in the L1 cache 120, a request is made from the memory controller 125 via cable 131, bus interface 112 and interconnect bus 150 to the memory access circuit 200. The bus interface 131 is connected to the interconnect bus 150 via bidirectional cable 140 and memory access circuit 200 is connected to the bus 150 via bidirectional cable 240. The memory access circuit 200 includes a bus interface 201 connected to the L2 cache 220 via cable 221 and connected to control logic 210 via cable 212. The control logic 210, in response to a request for access to a particular main memory address determines whether the desired address is in the L2 cache 220. If so, the control logic 210 causes the L2 cache 220 to provide the requested data, in case of read operation, to the bus interface 201. From there, it is transmitted via bus 150 to the bus interface 112 in processor 100. In the event that the requested address is not in the L2 cache 220, the control logic controls the memory interface 225, to which it is connected via cable 226 to access the main memory 300 via memory bus 250. Information, which may be in the form of instructions or data, read from the main memory 300 is transferred to the bus interface 201 and the L2 cache 220 via the memory interface 225 and cables 224 and 227, respectively.

As is well known in the art, processors such as the processor 100 typically have a cache memory of limited size containing information corresponding to a limited number of address ranges of the main memory 300 and the information in the L1 cache 120 is updated as needed by the IPU 110. A number of well known schemes for updating a local cache are known. In a typical scheme, the memory controller is able to determine from available tables whether a copy of the addressed information is in the local cache 120. If so, the IPU is allowed to access the cache for a memory read/write operation. In the event that a copy of the address identified by the IPU 110 is not currently in cache 120, a request is made to the memory access circuit 200 for an address block, typically referred to as a page, in which the requested address resides. The control logic 210 of the memory access circuit 200, by means of available tables, makes a determination as to whether the requested address block is in the L2 cache 220. If so, a copy of the requested block is transferred to the level L1 cache 120 for use by the IPU 110 under direction of the memory controller 125. In the event that the requested block is not in the L2 cache 220, the control logic 210 of the memory access circuit 200 addresses the main memory 300 and obtains the requested block. The obtained address block is transferred to the L2 cache 220 and to the L1 cache 120 of the one of the processors 100 from which the request originated.

In a multiprocessor system with several of the processors 100, an arbiter is needed to assure that the processors are served in accordance with a pre-defined fairness or priority scheme. In the system of this invention, arbitration is controlled by the control logic 210 with the use of a hardware queue 215.

Whenever the control logic 210 finds that a memory address request for access by one of the processors 100 is contained within the L2 cache 220, such an occasion is referred to as a HIT and the request is served without accessing the main memory 300. When the requested data block is not found in the cache 220, it is said to be a MISS. For each MISS, the main memory must be accessed. The main memory 300 is typically a large memory with relatively long access time, such as a disk store. To read information from the disk store, memory access circuit 200 transmits a read request and waits for data to be received from the disk store. The time that the memory access 200 waits for data from main memory, after a read request has been transmitted, is called a MISS window. The MISS window is usually sufficiently long, compared to the operating times of the memory access circuit 200 that it is possible and desirable to serve HIT requests from other processor during the MISS window. This requires an arbiter which will separately serve HIT requests and MISS requests in accordance with a pre-defined selection scheme. The additional circuitry required to serve HIT requests during MISS window is considered to be worthwhile even if the MISS window is only long enough to allow one HIT to be served.

In the system of this invention, an arbiter for serving both HIT and MISS requests is implemented by means of a single queue register and a pointer register. The single register arbiter of this invention incorporates essentially two separate queues in a single register and distinguishes between the two queues by means of a pointer which defines the demarcation between a queue of short-term access requests and a queue of long-term access requests. The control logic 210 is preferably implemented by means of a finite state machine or the like which selectively activates the necessary control cables to the bus interface 201, cache 220 and memory interface 225. The control logic 210 uses the hardware queue 215 as an arbiter. In this illustrative system, requests from the several processors 100 are served in accordance with a pre-defined sequence which is equivalent to providing service to the first requesting processor and assuring that all requesting processors are served before a previously served processor is served again.

Figure 2:
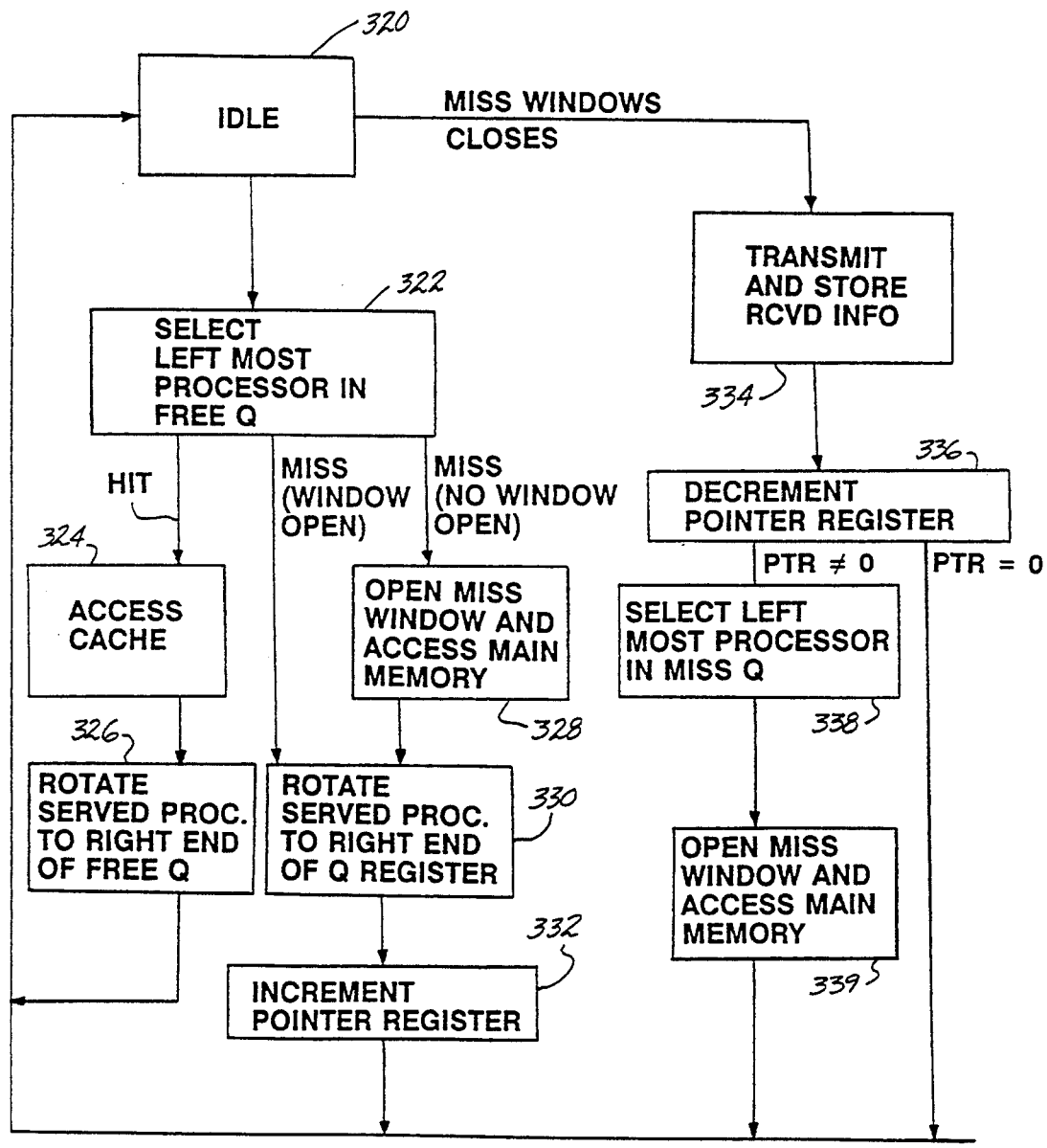
FIG. 2 is a sequence flowchart illustrating functions performed in the system of FIG. 1.
Figure 6:
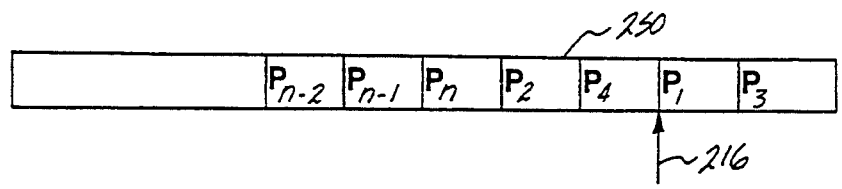
Figure 7:
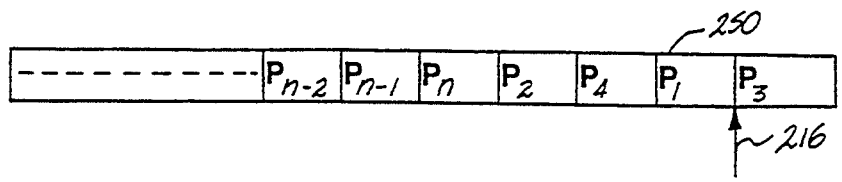
Figure 8:
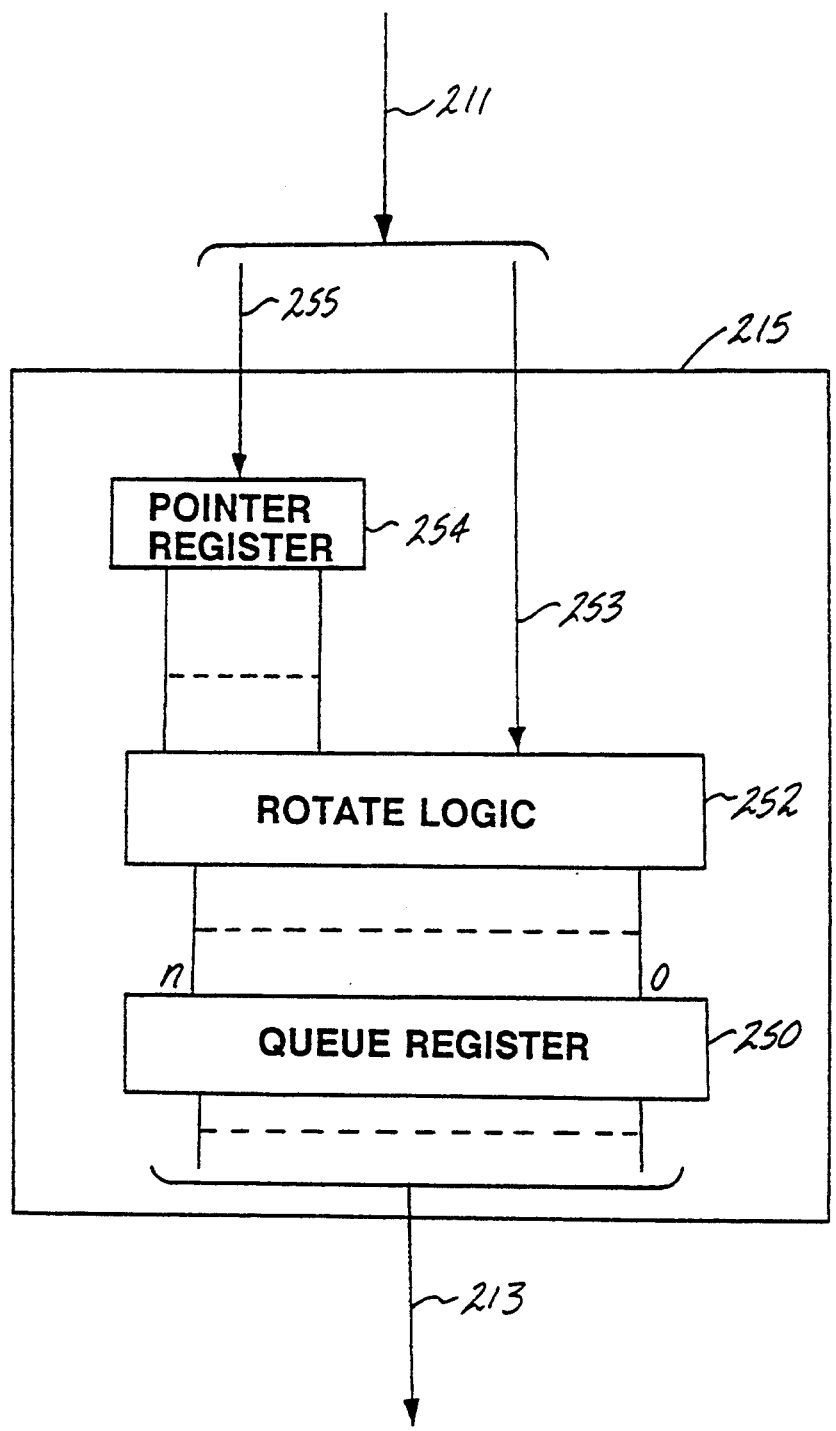
FIG. 8 is a more detailed block diagram representation of a single register queue employed in the system of FIG. 1.

FIG. 2 is a sequence flowchart illustrating actions of the control logic 210 and is described later herein. FIGS. 3 through 7 are sequence chart are representations of the queue 215. The queue 215 is implemented by means of a multiposition shift register 250 and a pointer register 254, as shown in FIG. 8. The register 250 has n multi-bit positions, as depicted in FIGS. 3 through 7 and the bits in each of the positions identify one of the n processors of the system. The number of binary bits in register 250 is defined by the mathematical expression $nLOG_2 n$, where n is the number of processors. A rotate logic circuit 252 is responsive to control signals received from control logic 210 via cables 211 and 253, and to the contents of pointer register 254 to rotate indices defining processors within the entire length of the register or within a portion of the register 250 to left of a pointer defined by the contents of the pointer register. The contents of pointer register 254 is updated, incremented or decremented, by control logic 210 via cables 211 and 255.

The leftmost position of the register 250 is the highest priority position in the primary or short-term access queue, referred to as the FREE queue in this particular embodiment of the invention, and the position immediately to the left of pointer 216 is the lowest priority position in the primary queue. The position of the register 250 immediately to the right of pointer 216 is the highest priority position in the secondary or long-term access queue, referred to as the MISS queue in this particular embodiment, and the rightmost position to the right of pointer 216 is the lowest priority position in the secondary queue.

The queue rotate algorithm for changing the queue register 250, when a processor M ($1 \leq m \leq n - PTR$) is selected in the FREE queue and the request is a HIT in cache 220, is as follows: $Q(m)=Q(m+1)$; $Q(m+1)=Q(m+2)$; ... ; $Q(n-PTR)=Q(m)$ where $Q(m)$ is a position in queue 215 storing the identity of a requesting processor, n is the total number of processors and PTR is the value of the contents of pointer register 254. When a processor m is selected from the FREE queue and the request is a MISS in cache 220, the queue rotate algorithm is as follows: $Q(m)=Q(m+1)$; $Q(m+1)=Q(m+2)$; ... ; $Q(n)=Q(m)$ and the pointer algorithm is: $PTR=PTR+1$. When a processor is selected from the MISS queue, the pointer algorithm is: $PTR=PTR-1$.

Figure 3:
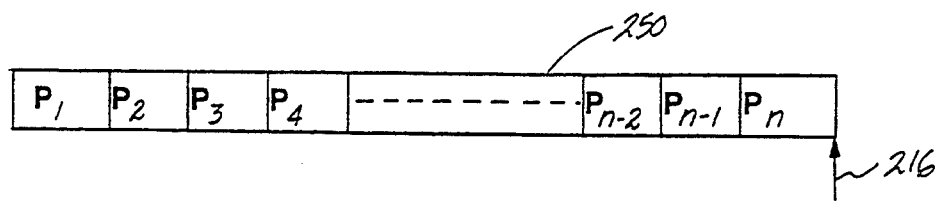
FIGS. 3 through 7 are diagrammatic representations illustrating operations of a queue register in the system of FIG. 1.
Figure 4:
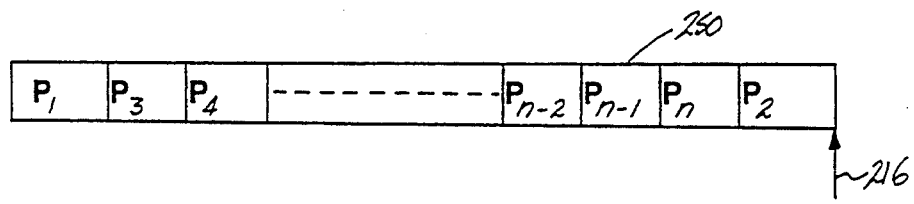

FIG. 3 is a diagrammatic representation of the queue register 250 in an initial condition in which the entries of the various processors are shown arranged in ascending order, from left to right. The pointer 216, representing the contents of pointer register 254, is in the 0 position. When requests to the memory access 200 are made from the processors 100, the requests are served in the order in which the entries for the requesting processors appear in the queue, from left to right. The serving of a request, as explained earlier, includes the first step of determining whether the requested memory address is in the L2 cache 220. If so, the request is considered to be a HIT and the requested information is transmitted from the L2 cache 220. When the request from a processor has been served, the identity of that processor is moved in queue 215 to the lowest priority position of the FREE queue to assure that request from other processors are served before the same processor is served again. By way of example, if requests are received from processors P2 and P3, processor P2 will be served first, and the identity of processor P2 will be moved to the rightmost position in the FREE queue, which is the rightmost position of the register when the pointer is zero. The identity of all other processors between the rightmost end of the FREE queue and the processor being served are shifted to the left by one position. FIG. 4 represents the queue register 250 after processor P2 has been served. Since, in this example, as the only request served is a HIT request, queue does not reflect any MISS requests.

Figure 5:
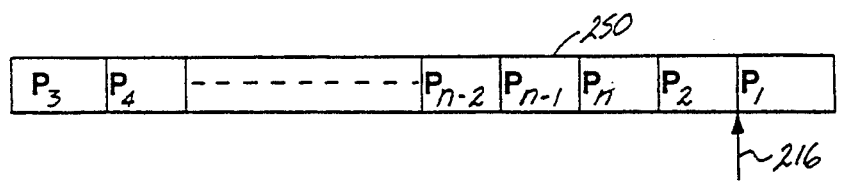

By way of a further example, assume that requests have been received from processor P1 and P3. As before, since the identity of P1 occupies the leftmost position of the requesting processors, it will be served first. Again for the purposes of this example, assume that the requested address is not found in the L2 cache 220. Thus, a MISS window is opened and a read request is transmitted to the main memory 300. The identity of processor P1 served in this request is moved to the rightmost position of the queue register 250 and all other processor identities are shifted to the left by one position. Furthermore, the pointer 216 is moved to the left by one position as well. Thus, the HIT queue has been reduced by one position and the MISS queue, formerly empty, now includes one position. This case is represented in FIG. 5. FIG. 6 represents the case in which the request from processor P3 was found to be a MISS. Accordingly, the identity of P3 is placed in the MISS queue to the right of processor P1 and the pointer 216 was moved to the left to show the demarcation between the FREE queue and the MISS queue. Furthermore, in the example of FIG. 6, the request from the processor P4 was found to be a HIT and the identity of processor P4 was moved to the rightmost position of the FREE queue, which is to the left of the pointers 216. FIG. 7 represents the case in which the MISS request from processor P1 has been completed and the MISS window for that request has been closed. Accordingly, the identity of the processor P1 is moved from the highest priority position of the MISS queue to the lowest priority position of the HIT queue. This is accomplished by simply moving the pointer 216 to the right by one position.

In the manner described with respect to these examples, the identity of processors which have been found to be HIT requests are rotated in the FREE queue in the portion of the register 250 defined by the position of the processor served and the position of the pointer 216. MISS requests waiting to be served are rotated in a portion of the shift register 250 defined by the position of the processor served and the rightmost position of the shift register, independent of the position of the pointer 216. The pointer is moved to the left by one position as part of the MISS request rotation. When a MISS request has been fully served, the pointer is simply decremented by 1, thereby expanding the size of the FREE queue and reducing the size of the MISS queue.

The operation of the control logic 210 is described in the following paragraphs with reference to the sequence flowchart of FIG. 2. The control logic 210 is initially in an idle condition as indicated by block 320 of FIG. 2 and on the detection of a request, serves the leftmost processor identified in the FREE queue as indicated in block 322. In the event that the request is a HIT, the cache 220 is accessed as indicated in block 324 and the identity of the served processor is rotated in queue to a position immediately to the left of the pointer 216 as depicted for example in FIGS. 4 and 6. Thereafter, a return is made to the idle state 320. If it is determined in block 322 that the request is a MISS, a main memory access must be initiated to fetch the requested information. However, it may be that such a main memory access has been initiated for another requesting processor already on the MISS queue, and that a MISS window has been opened for the other processor. If so, the new MISS request cannot be served immediately and must wait until the current MISS window is closed and further, until all other processors on the MISS queue have been served. Thus, if the request on the FREE queue is a MISS and a MISS window is already open, the identity of the requested processor must be added to the MISS queue. Accordingly, the identity of the requesting processor is rotated to the rightmost position of the queue register 250 as indicated in block 330. Additionally, the pointer register 254 is incremented thereby moving the pointer to the left by one position, as indicated in block 332. In this manner, the identity of the processor initiating the MISS request is entered on the MISS queue in the rightmost position of queue register 250 and to the right of the pointer 216. A return is made to the idle state of block 320 after the MISS has been entered on the MISS queue. If no MISS window is open when a MISS request is detected, such a window is opened and memory access is initiated as indicated in block 328, while the identity of the requesting processor is entered on the MISS queue as indicated in block 330 and 332. In this manner, HIT requests are served and the served processors are rotated in the FREE queue and MISS requests are added to the MISS queue.

When a MISS request has been completed, the MISS window closes and the requested information is transmitted to the requesting processor and is stored in a cache 220, as indicated in block 334. Thereafter, the pointer register 254 is decremented thereby moving the pointer 216 to the right by one position as indicated in block 336 and as depicted in FIG. 7. In the event that the new value of pointer register 254 is equal to 0, as depicted in FIGS. 3 and 4, indicating that the MISS queue is empty, a return is made to the idle state 320. In the event that the new value of pointer register 254 is not equal to 0 as depicted, for example, in FIG. 7, the request identified in the leftmost position in the MISS queue is selected, as indicated in block 338. The leftmost position in the MISS queue is defined as the position having a numerical value 1 less the value of the pointer register 254, where the rightmost position of register 250 is position "0". Thereafter, a MISS window is opened for the selected processors as indicated in block 339 and the information requested by the processor in the highest position of the MISS queue is fetched from memory. In this manner, MISS requests are served from the MISS queue and HIT requests are served from the FREE queue during MISS windows and both the MISS queue and FREE queue are implemented by means of a single register wherein indices representing the processors of the system are moved from the MISS queue to the FREE queue by changing the contents of the pointer register 254.

It will be understood that the embodiment described herein is only illustrative of the principles of the invention and that other embodiments can be derived by those skilled in the art without departing from the spirit and scope of the invention.

What we claim is:

1. A data processor system comprising:
    a predetermined number of subsystems generating service requests;
    a plurality of shared resources of a first and of a second type shared by the subsystems;
    an arbiter circuit responsive to the service requests to serve the requests by providing access to the shared resources from the subsystems;
    the service requests including service requests of a first type for access to resources of the first type and service requests of a second type for access to resources of the second type;
    the arbiter circuit comprising a multiposition queue register, having opposite ends, and a pointer register storing a value defining the number of requests of the second type;
    the queue register defining an order of priority of requests of the first type and an order of priority of requests of the second type, the queue register comprising a predetermined number of sequentially arranged positions, equal in number to the number of subsystems, and comprising indices identifying one of the subsystems in each of the positions, the indices arranged in the queue register in order of priority, the position nearest the one end of the queue register representing the highest priority in a queue of requests of the first type and a position immediately adjacent a position removed from the opposite end of the queue register by a number of positions equal to the value stored in the pointer register representing the lowest priority for requests of the first type;

a position in the queue register removed from the opposite end of the queue register by a number of positions defined by the value in the pointer register representing the highest priority in a queue of requests of the second type and the position nearest the opposite end of the queue register representing the lowest priority position in the queue of requests of the second type.

2. The system in accordance with claim 1 and further comprising a control circuit operative to modify the contents of the pointer register and wherein indices representing a selected one of the data processing circuits in the highest priority position of requests of the second type is moved to a lowest priority position of requests of the first type by decrementing the value in the pointer register.

3. The system in accordance with claim 1 wherein the control circuit is operative to transfer indices representative of a selected subsystem from a first position in the queue of requests of the first type to a second position in the queue of requests of the second type by shifting all indices between the first position and the second position by one position in the direction of the one end of the queue register and inserting the indices representative of the selected subsystem in the second position and incrementing the value in the pointer register.

4. The system in accordance with claim 3 wherein the control circuit is further operative to transfer indices representing the selected subsystem to the lowest priority position in the queue of requests of the first type by shifting all indices between the position defined by the value of the pointer register and the one end of the queue register in the direction of the one end and inserting the indices representing the selected processor in the position immediately adjacent the position defined by the value of the pointer register.

5. A data processor system comprising:
a plurality of subsystems generating service requests;
a plurality of shared resources shared by the subsystems including short-term resources requiring relatively short access times and long-term resources requiring relatively longer access times; and
an arbiter circuit responsive to the service requests to service the requests by providing access to the resources from the data processing circuits;
the service requests including short-term service requests for access to short-term resources and long-term service requests for access to long-term resources;
the arbiter circuit comprising a multiposition queue register having opposite ends, a pointer register storing a value defining the number of long-term resource requests awaiting access, and a control circuit;
the queue register comprising a plurality of sequentially arranged positions and storing indices identifying one of the subsystems in each of the positions, the indices arranged in the queue register in order of priority with the position nearest the one end of the queue register representing the highest priority;
the control circuit responsive to a received short-term service request from one of the subsystems identified by indices in one of the positions of the queue register to serve the received short-term request and to move the indices identifying the one subsystem to a position in the queue register immediately adjacent a position removed form the opposite end of the queue register by a number of positions defined by the value in the pointer register;
the control circuit further responsive to a received long-term request from one of the subsystems identified by the indices in the queue register to move the indices identifying the one subsystem from which the long-term request received to a position nearest the opposite end of the queue and to increment the value in the pointer register.

6. The system in accordance with claim 5 wherein the control logic serves long-term requests and wherein the control logic decrements the value in the pointer register upon completion of service of a long-term request.

7. A multiprocessor system comprising a predetermined number of data processors, a main memory storing predefined information at specified memory addresses and a memory access circuit connected to each of the processors and the main memory, the processors each generating memory read requests each identifying a requested main memory address;
the memory access circuit comprising a cache memory storing data corresponding to data in selected addresses of main memory, a multiposition queue register having opposite ends, a pointer register storing a value defining a number of memory read requests requiring access to main memory and control logic;
the queue register defining a primary queue and a secondary queue, the register comprising a predetermined number of sequentially arranged positions, equal in number to the number of data processors, and indices identifying one of the processors stored in each of the positions, the indices arranged in the queue register in order of priority of the corresponding processors, wherein the position nearest one end of the queue register stores indices identifying the data processor having the highest priority in the primary queue, a position immediately adjacent a position removed from the opposite end of the queue by a number of positions equal to the value stored in the pointer register stores indices identifying the data processor having the lowest priority in the primary queue, a position removed from the opposite end by a number of positions defined by the value in the pointer register stores indices identifying the data processor having the highest priority in the secondary queue and the position nearest the opposite end of the register stores indices identifying the data processor having the lowest priority in the secondary queue;
the control circuit responsive to a received memory read request from a requesting one of the data processors identified by indices in one of the positions of the queue register to examine the cache memory at the defined address and to shift all indices in positions between the one position and the opposite end of the register in the direction of the one end by one position and to enter the indices defining the requesting processor in the lowest priority position of the secondary queue nearest the opposite end of the queue register and to increment the value stored in the pointer register when data corresponding to data of the main memory address for the received request is not found in the cache memory, whereby the indices of a processor requiring access to the main memory are moved from a primary queue to a secondary queue without requiring more positions in the queue than the total number of processors served.

8. The system in accordance with claim 7 wherein the control logic is responsive to the received memory read request to shift all indices in positions between the one position and the position removed from the opposite end of the register by a number of positions equal to the value stored in the pointer register in the direction of the one end of the register by one position and to enter the indices defining the requesting processor in the lowest position of the primary queue immediately adjacent the position removed from the opposite end of the register by a number of positions defined by the value stored in the pointer register when data corresponding to data of the main memory address for the received request is found in the cache memory.

9. The system in accordance with claim 7 wherein the control logic addresses main memory and is responsive to the receipt of data from main memory to decrement the value in the pointer register when data corresponding to data of the main memory address for the received request is not found in the cache memory.

10. In a data processing system comprising a plurality of processors and a memory system comprising a main memory having a plurality of main memory locations each storing a memory word and a cache memory having a plurality of memory locations storing each storing one of the memory words, a method of serving memory requests comprising the steps of:

arranging indices identifying each of the processors in a sequence in a multiposition register from one end of the register defined as a high priority end to another end of the register defined as a low priority end;

serving a memory request from a first requesting processor identifying a first memory word by accessing the cache memory;

if the first memory word is not found in the cache memory, moving the indices identifying the first requesting processor to a low priority position adjacent the low priority end of the register;

designating the low priority position as a priority position for a main memory access operation;

recording a pointer value defining a demarcation line having a position in the register disposed between processor priority positions for access to the cache memory and processor priority positions for access to the main memory;

serving a memory request from a second requesting processor identifying a second memory word by accessing the cache memory; and if the second word is found in the cache memory, moving the indices identifying the second requesting processor to a position between the high priority end of the register and the demarcation line.

11. The method in accordance with claim 10 and further comprising the steps of:

accessing the main memory for the first memory word and moving the indices identifying the first requesting processor to a position in the register between the high priority end of the register and the demarcation line.

12. The method in accordance with claim 11 and further comprising the step of decrementing the pointer value.

* * * * *